United States Patent [19]

Bertheas et al.

[11] Patent Number: 5,058,082
[45] Date of Patent: Oct. 15, 1991

[54] LINEAR HYDROPHONIC ANTENNA AND ELECTRONIC DEVICE TO REMOVE RIGHT/LEFT AMBIGUITY, ASSOCIATED WITH THIS ANTENNA

[75] Inventors: Jean Bertheas, Villeneuve Loubet; Gilles Moresco, Cagnes S/Mer; Philippe Dufourco, Peymeinade, all of France

[73] Assignee: Thomson-CSF, Puteaux, France

[21] Appl. No.: 571,217

[22] Filed: Aug. 23, 1990

[30] Foreign Application Priority Data

Sep. 8, 1989 [FR] France .................. 89 11749

[51] Int. Cl.$^5$ .................................... G01S 3/80
[52] U.S. Cl. ............................ 367/130; 367/12
[58] Field of Search ............ 367/130, 12, 129, 124, 367/118, 123, 153, 165, 173, 188, 15, 16

[56] References Cited

U.S. PATENT DOCUMENTS

| | | | |
|---|---|---|---|
| 1,482,980 | 2/1924 | Fay | 367/12 |
| 3,939,469 | 2/1976 | Park | 367/157 |
| 4,078,223 | 3/1978 | Strange | 367/177 |

FOREIGN PATENT DOCUMENTS 1541829  9/1968  France .
1138133 12/1968  United Kingdom .

Primary Examiner—Daniel T. Pihulic
Attorney, Agent, or Firm—Oblon, Spivak, McClelland, Maier & Neustadt

[57] ABSTRACT

A linear hydrophonic antenna with an associated portside/starboard ambiguity removing device comprises three streamers placed in an equilateral triangle, with a center distance of the order of a third of the wave length which corresponds to the center frequency received. The density of the median streamer is notably greater than the common density of the other two streamers. Channels are formed in a standard way, and the received signals are phase shifted then added up so that the directivity associated with each channel shows a zero, either at portside or at starboard, the direction of which remains fixed despite the roll.

16 Claims, 3 Drawing Sheets

LINEAR HYDROPHONIC ANTENNA AND ELECTRONIC DEVICE TO REMOVE RIGHT/LEFT AMBIGUITY, ASSOCIATED WITH THIS ANTENNA

BACKGROUND OF THE INVENTION

1. Field of the Invention

The present invention pertains to a linear hydrophonic antenna, formed by omnnidirectional and acoustically transparent hydrophonic sensors. It also pertains to an electronic device for removing left/right ambiguity, associated with this antenna.

2. Description of the Prior Art

A linear hydrophonic antenna is generally constituted by a "string" of omnidirectional hydrophonic sensors contained in a sheath filled with an insulating oil. This sheath contains also the electronic modules associated with these sensors, this linear assembly forming a "streamer" that is generally towed by a vessel.

A linear antenna of this type forms a passive sonar system, the directivity characteristics of which do not make it possible to know whether the detected object (such as a sea vessel or underwater vessel) is to the right or to the left, above or below.

Since the distances of detection are high (generally several kilometers), this amounts to having a right/left (or starboard/portside) ambiguity which, for obvious reasons, must imperatively be removed.

Generally, several channels are formed in several directions in such a way that, for example, the observation sector is of the order of 120 degrees. The formation of these channels takes place in a very conventional way by the rephasing of the signals of the hydrophonic sensors for a given direction.

However, since the hydrophonic sensors are omnidirectional, it is not possible to have a priori knowledge of whether the signal received on a channel corresponds to a portside direction or to a starboard direction.

To remove this left/right ambiguity without any device specially designed for this purpose, the vessel may maneuver, but this very simple method constitutes an operational handicap that rules it out because of its slowness.

There is a known way to confer a certain degree of directivity on hydrophonic sensors by making them in the form of DIFAR (Direction Finding And Ranging) type modules.

Each hydrophonic module is therein formed by four sensors forming two orthogonal dipoles. A linear hydrophonic antenna of this type is described in the French patent application No. 88 16 803, filed by the Applicant on 20th December 1988. It is a linear modular antenna for which each hydrophonic module has two pairs of hydrophonic sensors forming two orthogonal dipoles, said module being associated with means for identifying the direction of the wave sources picked up. Each of these modules is then formed by a parallelepiped-shaped support bearing a hydrophonic sensor (surface sensor of pressure in this example) on each of its four lateral faces. The drawback of such a device lies in its complexity and, hence, its cost price.

SUMMARY OF THE INVENTION

The invention seeks to overcome these drawbacks and, to this effect, it proposes a linear hydrophonic antenna which, while it is simple (and hence costs little) to make, enables a simple and almost instantaneous removal of left/right ambiguity by means of an associated electronic device. Besides, this linear hydrophonic antenna has excellent navigability and, notably, good stability under roll. This antenna consists of three streamers each having, in a standard way, a string of omnidirectional and acoustically transparent hydrophonic sensors. These three streamers are structurally identical, parallel to one another with their three corresponding ends located in one and the same plane orthogonal to their common axial direction, and they are joined to one another by a central core which is rigid at least in the plane orthogonal to this axial direction so that the three of them, sectionally in this very same orthogonal plane, form a triangle that is advantageously isosceles (and preferably equilateral).

The densities of the insulator liquids that are contained in these three streamers, and in which the hydrophonic sensors and, generally, at least a part of their associated electronic units, are submerged, are chosen in such a way as to be identical for two of the streamers, while the density of the insulating liquid contained in the third streamer is notably different from the density relative to these first two streamers, in such a way that these first two streamers navigate at the same level, in giving the assembly good stability under roll.

With this antenna, there is associated an electronic device for removing left/right (or starboard/portside) ambiguity comprising, in addition to the standard means for the acquisition of the signals picked up:

means to form channels in bearing in a certain number of chosen directions, and means for associating, with each channel, a delay or a phase shift proper to each signal, respectively picked up by each of the three streamers, these three delays or these three phase shifts being determined so that, for this channel, they give a resultant signal which, after application of these respective delays or phase shifts and summations, is zero if it comes from one side (starboard for example) and not zero if it comes from the other side (portside for example).

According to a preferred case, the three streamers are arranged in an equilateral triangle, and the center distance between the two streamers is substantially equal to a third of the wavelength that corresponds to the center frequency received.

The three phase shifts to be applied for a channel corresponding to a given direction is then:

0 degrees for the median streamer;

$120° - 60° \sin G$, where G is the bearing angle, for the streamer supposed to be the furthest from the object, itself supposed to be in this direction, and $-(120° - 60° \sin G)$ for the third streamer, namely for the streamer which is supposed to be the closest to this object.

Of course, in the case of an opposite convention, it would be appropriate simply to reverse the respective signs of these last two phase shifts.

In the above mentioned case (center distance equal to a third of the wavelength received), the phase shifts due to the path differences with respect to that of the median streamer are 60° on either side of this streamer. In the general case where this path difference corresponds to an angle A, the phase shifts to be applied are 0 degrees for the median streamer and plus or minus $(120° - A \sin G)$ for the other two streamers.

Advantageously, moreover, this same electronic device has means for correcting these delays or phase shifts as a function of the roll and/or torsion angles of the antenna, which are measured by sensors placed on the hydrophonic antenna.

BRIEF DESCRIPTION OF THE DRAWINGS

In any case, the invention will be understood clearly, and its advantages and other characteristics will appear from the following description of a non-restrictive example of an embodiment of this linear hydrophonic antenna, and of its associated electronic measuring device with removal of right/left ambiguity, said description being made with reference to the appended schematic drawings, wherein.

DETAILED DESCRIPTION OF THE INVENTION

Figure 1:
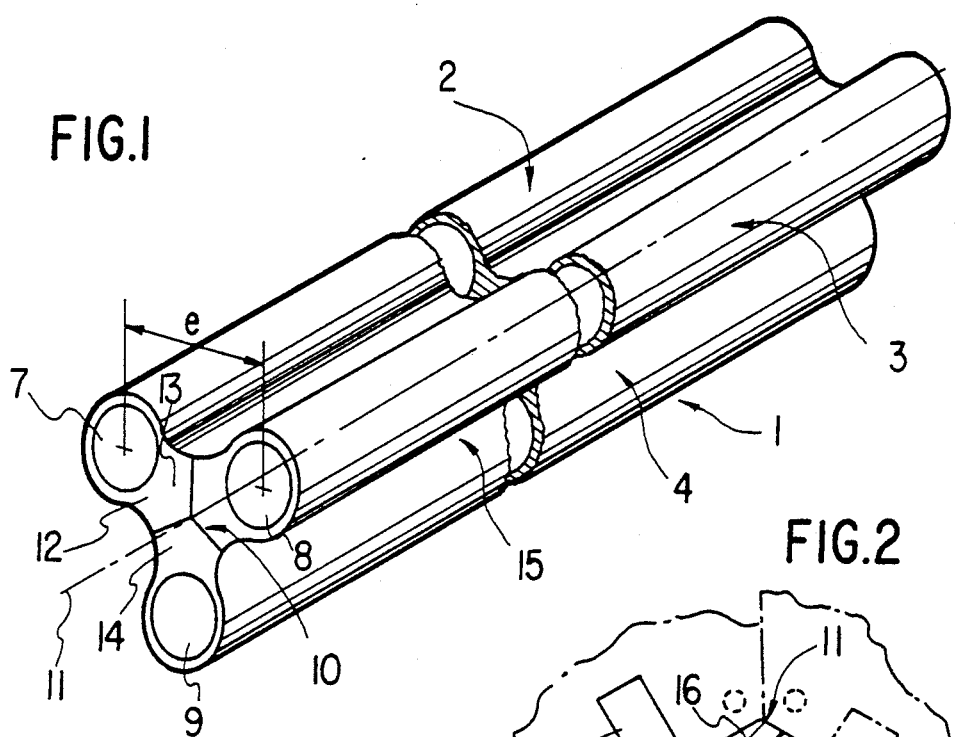
FIG. 1 is a view in perspective of this linear hydrophonic antenna.
Figure 2:
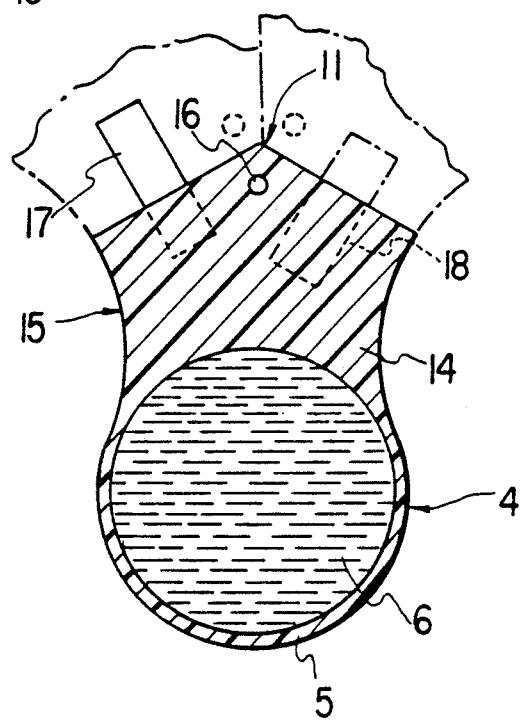
FIG. 2 is a cross-sectional view of the three elements which, when assembled, form the antenna of FIG. 1.

Referring firstly to FIGS. 1 and 2, this linear hydrophonic antenna 1 consists of three standard streamers 2, 3, 4 each traditionally comprising a string of omnidirectional and acoustically transparent hydrophonic sensors (or hydrophones).

Each streamer has an imperviously sealed sheath 5 which is filled with an insulating paraffin oil 6. The hydrophonic sensors (not shown) are held conventionally in this sheath by centering devices, and this sheath contains also the different associated electronic units, among them the preamplifiers which are placed between the sensors, and the electronic unit for signals acquisition and processing which is placed either at the center of the streamer or in a special section located at its head or at its tail.

The three streamers 2, 3, 4 are structurally identical and they are placed parallel to one another, in an equilateral triangle and without any axial offset between one streamer and another. This amounts to saying that their three corresponding ends, 7, 8, 9 (located on one and the same side of the antenna 1) are located in one and the same plane orthogonal to the longitudinal axis 11 of the antenna 1. To this end, they are joined by a central core 10 which is rigid in the plane orthogonal to the longitudinal axis 11 of the antenna and, in this example, is made of polyurethane, the (density×speed) product of which is adapted to that of sea water.

The center distance e between the three streamers (that is, the value of the side of the equilateral triangle) preferably does not have any unspecified value but is practically equal to a third of the wavelength corresponding to the center frequency f received, that is:

$e = c/3f$ where c is the speed of sound in water

This center frequency of operation f is:

either the center frequency of the passive listening band for an entirely passive sonar system;

or the transmission frequency for a sonar system comprising an activation function (the antenna 1 then constitutes the passive antenna of an active sonar).

Nor do the densities of the paraffin oils 6 contained in each of the three streamers 2, 3, 4 have unspecified values: they are chosen so that the antenna 1 has good stability under roll, with a roughly neutral buoyancy. In this example, the antenna 1 is designed to navigate with the streamer 4 pointed downwards (.e. towards the bottom of the sea) and, to this end, this streamer is filled with a paraffin oil having high density (close to 1.5 for example), while the two upper streamers 2 and 3, designed to navigate in one and the same horizontal plane, are filled with a paraffin oil having low density (close to 0.8 for example). Thus, the assembly is subjected to two opposite vertical forces. This makes it possible to obtain a stabilization of navigation, notably under roll.

The central core 10 is formed by the assembling of three structural sections 12, 13, 14, of which one, 14, is shown in detail and in a cross-section in FIG. 2. They are formed so that, between each pair of streamers (4 and 3 for example), they have a concave-shaped hollow part 15. This has the advantage of placing the maximum limit on the space occupied by the assembly, and hence on its weight in air, and of delaying the appearance of a turbulent flow of water along the walls.

As can be seen in FIG. 2, each structural section 14 also forms, out of one and the same block, the sheath 5 of the corresponding streamer 4.

In the massive part of the structural section 14, and close to the axis 11 of the antenna, there is embedded a cable 16 for taking up stresses (it is embedded here instead of being embedded in the sheath as would be the case for a single streamer according to the prior art).

The three structural sections are assembled, in order to form the central core 10, by simple water-resistant bonding. Besides, a joining device using a tenon 17 and mortise 18 is furthermore advantageously provided for the lower structural section 14 in order to obtain high rigidity under torsion, the tenon 17 being metallic.

In this version, where the core 10 is made of polyurethane, the antenna 1 is designed so that, under deflection, it has sufficient flexibility to enable it to be wound around a reel (during storage). The three cables 16 for taking up stresses are then glass fiber or carbon fiber rods, ensuring that there are no ripples during navigation and restricting longitudinal elongation.

This "tri-streamer" antenna 1 is designed to enable a removal of portside/starboard ambiguity by electronic processing. The mathematical principle of this removal of ambiguity is now explained by means of FIGS. 3 to 5.

Figure 3:
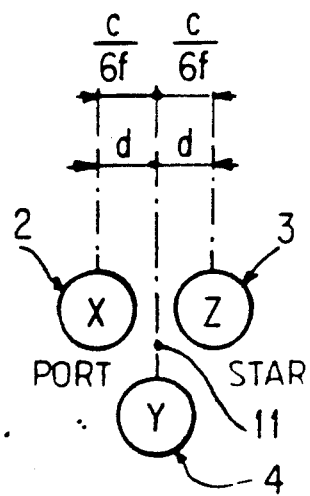
FIGS. 3 to 5 are explanatory diagrams of the principle, according to the invention, by which the removal of right/left ambiguity is achieved.

FIG. 3 gives a schematic view of the three streamers 2, 3, 4 in their navigation position of FIG. 1, i.e. with the streamers 2 and 3 pointed upwards and in one and the same horizontal plane, and the "median" streamer 4 pointed downwards, i.e. towards the bottom of the sea.

For this application, it is assumed that the object to be detected is located in the 90° bearing plane (the plane orthogonal to the axis 11 of the antenna) and its elevation is, for example, 0 degrees (i.e., as is the case for a vessel, it is in the same horizontal plane as the antenna). It is assumed, moreover, for the clarity of the explanation, that the roll is zero.

Figure 4:
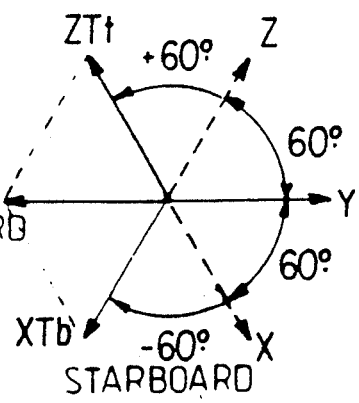
Figure 5:
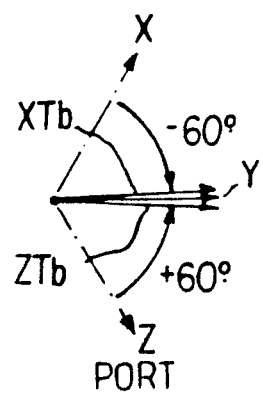

The (vector) signals received respectively by the streamers 2, 3 and 4 are respectively designated by the references X, Z and Y in these FIGS. 3 to 5.

In FIG. 3, "starboard" is of course to the right and "portside" to the left. The object to be detected (for example a ship) is assumed to be on the portside. The antenna 1, since it is omnidirectional, is in principle incapable of determining this fact.

It has been seen earlier that the center distance e (of FIG. 1) between streamers is chosen to be equal to c/3f, f being the center frequency received. This means that, in projection in the horizontal plane, the distances d between the axes of the streamers 2 and 4, on the one hand, and 3 and 4, on the other hand, are equal to c/6f, i.e. to a sixth of the wavelength. It follows, as shown in FIGS. 4 and 5, that since the signal Y received by the median streamer 4 is taken to be the origin of the phases, the signals X and Z received are phase shifted with respect to this signal Y by an angle of lead or of delay (as the case may be) that corresponds to the path distance d, i.e. when d=c/6f, by an angle of 60 degrees.

at portside (FIG. 5), the vector X is in the lead by 60 degrees with respect to the vector Y (since, the object being really at portside, the signal received by the streamer 2 is obtained before the signal received by the median streamer 4), while the vector Z is delayed by 60 degrees with respect to the vector Y;

at starboard (FIG. 4), the situation is exactly the opposite one (since the object is actually at portside), so that the vector X is delayed by 60 degrees with respect to the vector Y while the vector Z is in the lead by 60 degrees with respect to this vector Y.

Of course, since the object is at a great distance from the antenna 1, the amplitudes of the respectively received signals, namely the respective intensities of the vectors X, Y, Z, are practically equal.

If the signals Z and X are phase shifted respectively by +60 degrees and by −60 degrees, three vectors Y, ZTt and XTt are obtained for a signal coming from starboard. These three vectors are equal in amplitude and are at 120° with respect to one another and, consequently, the resultant is zero. For a signal coming from portside, three superimposed vectors Y, ZTb, YTb are obtained. The resultant of these three superimposed vectors forms a maximum signal, equal to thrice the intensity of these vectors.

The principle of the invention consists in applying this processing to the channels in bearing formed from the three streamers.

For the inclined channels, the bearing of which is different from 90 degrees, the phase shifts to applied to the signals of channels of the streamers 2 and 3 correspond to the paths projected on the 90° bearing axis: for an angle G bearing, these phase shifts are equal to: ±(120°−60°.sin G).

Since there is a loss of sensitivity as and when the axis of the antenna is approached, in practice channels are formed only in directions that correspond to bearing between 30 degrees and 150 degrees, namely in a cone of 120 degrees. In any case, the functional value of a portside/starboard distinction near the axis of the antenna is low.

The above reasoning assumes the absence of roll. As shall be seen hereinafter, the electronic device associated with this tri-streamer antenna very fortunately enables the values of the above-mentioned phase shifts to be corrected as a function of the roll and/or torsion angles of the antenna.

According to one variant, the distance e may be smaller than or greater than c/6f. In this case, there is quite clearly a loss of sensitivity with respect to the optimum case where e=c/3f.

Figure 6:
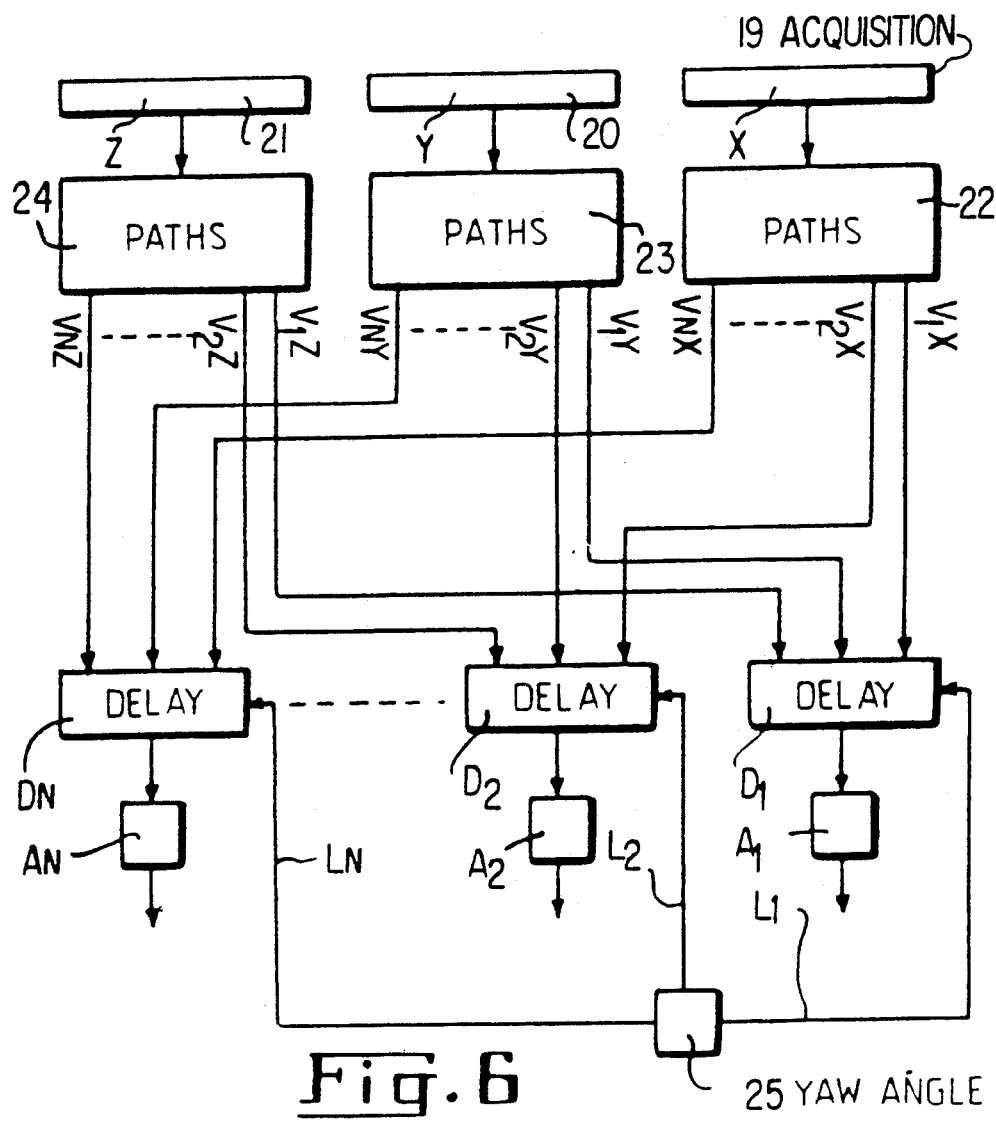
FIG. 6 is a block diagram of the electronic measuring and ambiguity removal device associated with this invention.

FIG. 6 shows a block diagram of the electronic device associated with the antenna 1 enabling the removal of right/left ambiguity with roll compensation.

In this FIG. 6, the references 19, 20 and 21 respectively designate the units for acquisition of the signals picked up respectively by the streamers 2, 4 and 3.

The digitized signals X, Y, Z at output of these units 19, 20, 21 are applied respectively to the channel-formation units 22, 23, 24. In a given direction, a first channel is formed, the measurement signals of which respectively come out of the unit 22 at V1X, the unit 23 at V1Y and the unit 24 at V1Z. For the adjacent direction, a second channel is formed. The measurement signals of this second channel come out at V2X, V2Y and V2Z, and so on and so forth. The channels are formed in a standard way, using signals coming from the hydrophones, to cover, for example, a sector of 120 degrees around the axis of the tri-streamer antenna.

All three of the digitized signals V1X, V1Y, V1Z which correspond to the first channel mentioned above are applied to a unit D1 comprising the phase-shifting or delay means to be applied to the three signals. In the same way, all three signals V2X, V2Y, V2Z are applied to a second phase-shifting or delay unit D2, and so on and so forth, the signals VNX, VNY, VNZ being applied to an Nth phase-shifting or delay unit DN, these phase shifts or delays being prepared as explained above (with reference to FIGS. 3 to 5) and being corrected by the values of the roll and torsion angles measured by at least two sensors (unit 25) located at the two ends of the tri-streamer antenna. To this end, the corresponding angle values are introduced into the logic units D1 to DN by the links L1 to LN.

These digital signals, phase-shifted or delayed in the logic units D1 to DN, are then added up (according to the principle described above with reference to FIGS. 4 and 5) in the respective adders A1 to AN, to finally give the digital values V1 to VN which are then applied to a standard analyzing and processing device (not shown). All these processing operations are performed simultaneously in every direction.

It goes without saying that the invention is not restricted to the exemplary embodiment that has just been described, and a great many other variants are possible.

The three streamers need not be placed in an equilateral triangle provided, however, that it is an isosceles triangle. The densities of the paraffin oils 6 could be chosen so that the navigation occurs with one streamer pointing upwards and the other two navigating in one and the same horizontal plane, hence beneath this first streamer. In such a case, it would contain a paraffin oil with a density greater than the one filling this first streamer.

Figure 7:
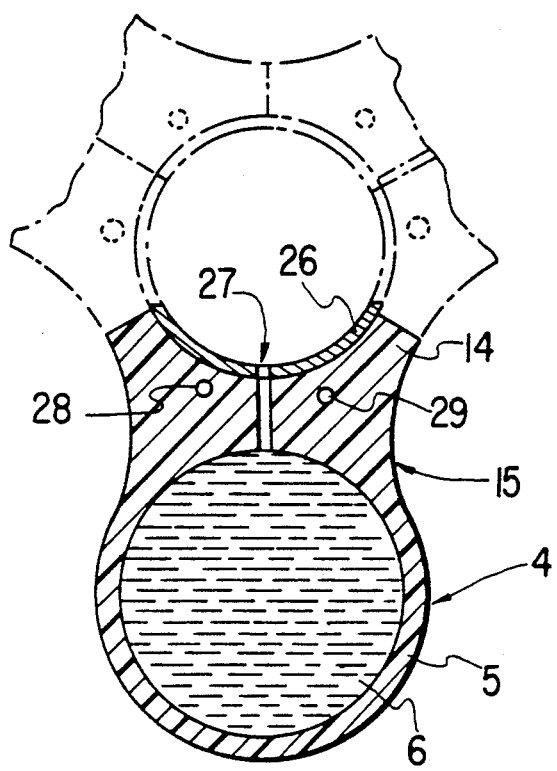
FIG. 7 is a view similar to that of FIG. 2, showing an alternative mechanical embodiment of this antenna.

The concave hollows 15 of the central core 10 are only optional and, besides, it is possible to make this very same central core in another way. As an example, FIG. 7 represents a variant of the structural sections such as 14, which is then such that it makes room for a rigid central tube 26, made of metal or rigid PVC, which forms an anti-torsion bar. In this tube 26, there is then a space available, in which it is possible to house the electronic units, or at least some of them. Drillings 27 are provided in this case to enable the imperviously sealed passage of the connections, and cables 28, 29 for taking up stresses are also provided. The three structural sections such as 14 are fixed to the tube 26 either by bonding or by screwing (this then enables them to be disconnected if need be).

In this variant according to FIG. 7, the tri-streamer antenna is entirely rigid, under deflection and under torsion, and this is an advantage. By contrast, it cannot be curved to enable it to be wound around a reel. This limits its length owing to imperatives of space factor for storage.

According to another possible exemplary variant, the central core 10 may be made separately, forming a part that is either massive or hollowed out at the center. The streamers 2, 3, 4, each of which are made separately with their sheath and, if necessary, with a small molded part, are then attached to the structural section to which they are, for example, fixedly joined by bonding.

The electronic means according to the invention may also have variants: for example, the phase shifts or delays may be applied at the output of the units 19 to 21, i.e. to each hydrophone signal before the formation of the channels by the units 22 to 24.

As a numerical example, a prototype has been made by the Applicant with the following characteristics:
center frequency of operation: 3.5 kilohertz
total number of hydrophones: 48 (that is, 16 per streamer)
Chebyhev weighting
length of the tri-streamer antenna: 3.20 meters
distance between horizontal streamers: 0.143 meters
distance between the axis of the lower streamer and the axis of the antenna: 0.124 meters.

Figure 8:
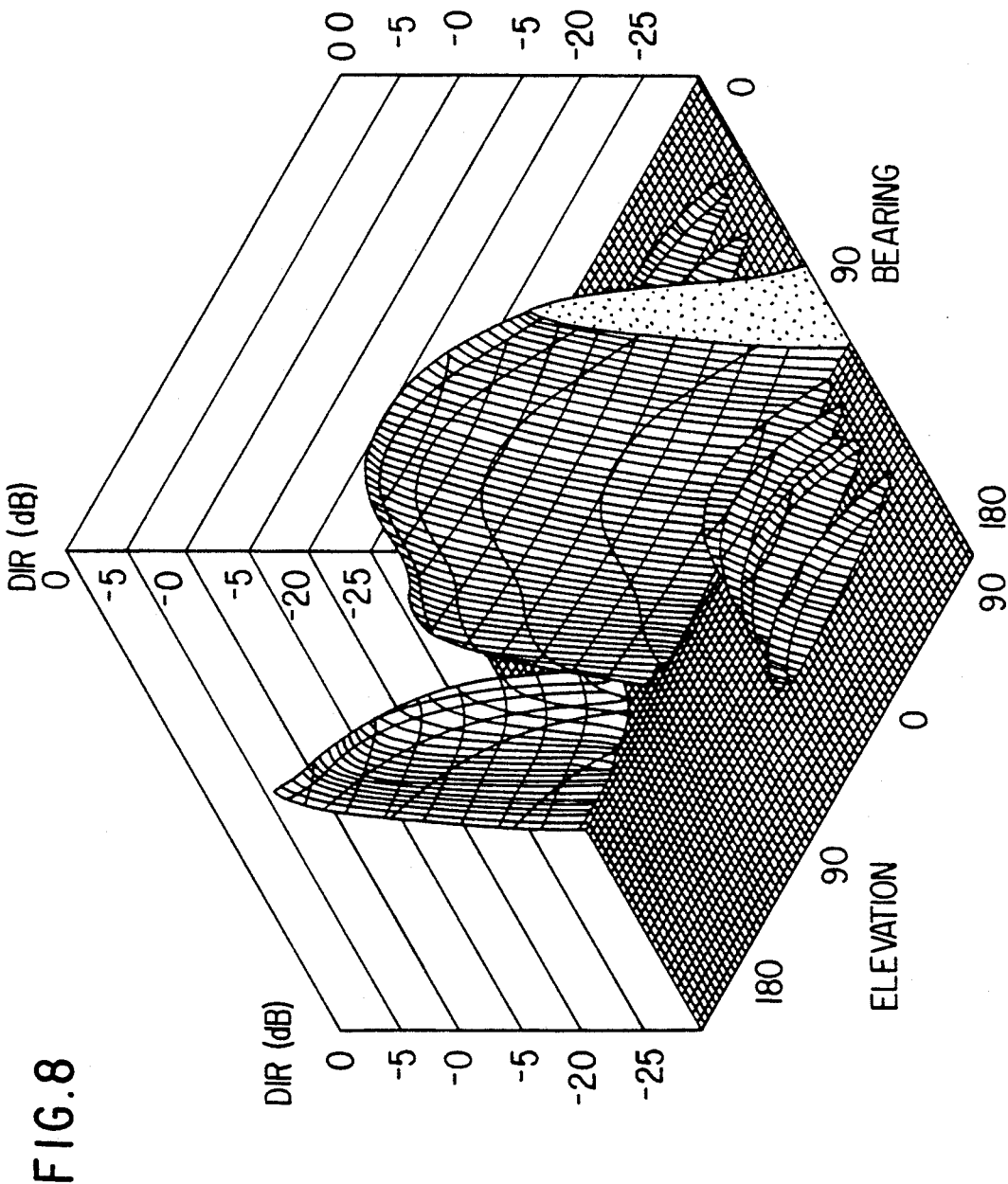
FIG. 8 is a three-dimensional graph giving the gain in elevation and in bearing for a 0° bearing channel of a prototype of an antenna according to the invention.

This device was used to measure the curve of directivity for the 0° bearing channel shown in FIG. 8, which shows excellent portside/starboard doubt removing quality. Also observed was a rejection above 10 dB on the entire starboard space between the 90° elevation and the 240° elevation.

As regards the correction in roll and torsion, for angles of roll and/or torsion smaller than plus or minus 10°, this device achieves a removal of portside/starboard ambiguity with a loss in sensitivity of less than 1 dB. This unexpected result highlights the superiority of the tri-streamer for, through the mechanical balancing obtained by the lower streamer (filled with a heavy fluid), the rotations remain substantially smaller than plus or minus 10 degrees.

What is claimed is:

1. A linear hydrophonic antenna that is made up of three streamers, each having a string of hydrophonic sensors, these hydrophonic sensors being omnidirectional and acoustically transparent, wherein these three streamers are structurally identical, parallel to one another offset and connected to one another by a central core that is rigid at least in the plane orthogonal to the axis of the antenna so that the three streamers form, sectionally in this orthogonal plane, an isosceles triangle, the densities of two of these three streamers being identical and the density of the third streamer being notably different, so that said third streamer is designed to point, during navigation, either upwards or downwards and the other two streamers are designed to navigate at the same horizontal level, barring rolling.

2. A hydrophonic antenna according to claim 1, wherein the three streamers are positioned in an equilateral triangle.

3. A hydrophonic antenna according to claim 1, wherein the central core is formed to have a concave-shaped hollow between each pair of streamers.

4. A hydrophonic antenna according to claim 1, wherein the central core forms a massive part in which at least on cable for taking up stresses is embedded.

5. A hydrophonic antenna according to claim 1, wherein the central core is formed by an assembly of three substantially identical structural sections.

6. A hydrophonic antenna according to claim 5, wherein each of these structural sections also includes, made out of one and the same block, the sheath of the corresponding streamer.

7. A hydrophonic antenna according to claim 1, wherein the central core is mounted on a rigid central tube.

8. A hydrophonic antenna according to claim 1, wherein the core is made separately and wherein the three streamers are mounted, with their sheaths, on this core.

9. A hydrophonic antenna according to claim 1, wherein one of the streamers contains an insulating liquid, the density of which is of the order of 1.5, while the other two contain an insulating liquid, the density of which is of the order of 0.8.

10. A hydrophonic antenna according to claim 1, wherein the center distance between the two streamers designed to navigate at the same level is of the order of a third of the wave length of the center frequency of operation of this antenna.

11. An electronic device for removing left/right ambiguity for a hydrophonic antenna according to claim 1, that comprises means for the acquisition of the signals picked up by the hydrophones of the three streamers, and further comprises:
means to form channels in a set of N determined directions;
means for associating, with each group of three signals of channels, three delays or three phase shifts; and
means for adding up the groups of the three signals thus processed and for giving N channel signals.

12. An electronic device according to claim 11, wherein the delays or phase shifts are determined so that the directivity of each channel signal has a zero, either at portside or at starboard.

13. An electronic device according to one of the claims 11 or 12, wherein the phase shifts or delays applied have a value of 0° for the median streamer and a value of $\pm(120° - A.\sin G)$ for the other two streamers, A being the phase that corresponds to the path difference between each of these two streamers and the median streamer, and G being the bearing angle of the channel considered.

14. An electronic device according to claim 11, further comprising means for correcting the delays or phase shifts as a function of rolling and/or torsion angles of the antenna.

15. A device according to claim 11, wherein the output signals measured after processing are applied to a device for analyzing and processing these signals for the final detection of the object.

16. A device according to claim 11, wherein the delays or phase shifts are made at the level of the hydrophone signals.

* * * * *